United States Patent
Cohen et al.

(10) Patent No.: US 11,334,743 B2
(45) Date of Patent: May 17, 2022

(54) SYSTEM AND METHOD FOR IMAGE ANALYSIS OF MULTI-DIMENSIONAL DATA

(71) Applicant: MOLECULAR DEVICES, LLC, San Jose, CA (US)

(72) Inventors: Avrum Cohen, Downington, PA (US); Dihui Hong, Chester Springs, PA (US); Steven Luke, Downington, PA (US)

(73) Assignee: Molecular Devices, LLC, San Jose, CA (US)

( * ) Notice: Subject to any disclaimer, the term of this patent is extended or adjusted under 35 U.S.C. 154(b) by 18 days.

(21) Appl. No.: 16/894,267

(22) Filed: Jun. 5, 2020

(65) Prior Publication Data

US 2020/0311377 A1 Oct. 1, 2020

Related U.S. Application Data

(63) Continuation of application No. 15/897,699, filed on Feb. 15, 2018, now Pat. No. 10,706,259, which is a
(Continued)

(51) Int. Cl.
*G06K 9/00* (2022.01)
*G02B 21/36* (2006.01)
*G06T 7/00* (2017.01)

(52) U.S. Cl.
CPC ......... *G06K 9/0014* (2013.01); *G02B 21/365* (2013.01); *G06K 9/00127* (2013.01);
(Continued)

(58) Field of Classification Search
CPC ............. G06K 9/0014; G06K 9/00201; G06K 9/00127; G06K 9/00134; G02B 21/365;
(Continued)

(56) References Cited

U.S. PATENT DOCUMENTS 5,936,731 A * 8/1999 Cabib .................. A61B 3/12
356/456
6,345,115 B1 2/2002 Ramm et al.
(Continued)

FOREIGN PATENT DOCUMENTS

CN 1623163 A 6/2005
CN 101490529 A 7/2009
(Continued)

OTHER PUBLICATIONS

International Preliminary Report on Patentability for Application No. PCT/US2017/016126, dated Aug. 23, 2018 (7 pages).
(Continued)

*Primary Examiner* — Aaron W Carter
(74) *Attorney, Agent, or Firm* — McCracken & Gillen LLC

(57) ABSTRACT

A computer-implemented system and method for analyzing a biological sample are disclosed. A sequence of images of the biological sample from an image capture device are received from an image capture device, wherein each image of the sequence of images is acquired at a particular focal plane of the biological sample. In addition, an object map is developed from the sequence of images and the object map is analyzed to measure a three-dimensional characteristic of a particular object. The object map comprises a plurality of object map planes, each object map plane is associated with one image of the sequence of images, and pixels of the object map planes associated with the particular object in the sequence of images are assigned a unique identifier associated with the particular object.

19 Claims, 10 Drawing Sheets

Related U.S. Application Data continuation of application No. 15/019,411, filed on Feb. 9, 2016, now Pat. No. 9,928,403.

(52) U.S. Cl.
CPC ..... *G06K 9/00134* (2013.01); *G06K 9/00201* (2013.01); *G06T 7/0012* (2013.01); *G06T 2200/24* (2013.01); *G06T 2200/28* (2013.01); *G06T 2207/30024* (2013.01)

(58) Field of Classification Search
CPC ............... G06T 7/0012; G06T 2200/24; G06T 2200/28; G06T 2207/30024
See application file for complete search history.

(56) References Cited

U.S. PATENT DOCUMENTS

| | | | | |
|---|---|---|---|---|
| 8,260,026 | B2* | 9/2012 | Plumb | G06K 9/00127 382/133 |
| 8,310,531 | B2* | 11/2012 | Nandy | G02B 21/16 348/79 |
| 8,564,623 | B2* | 10/2013 | Cohen | G02B 21/367 345/634 |
| 8,577,079 | B2* | 11/2013 | Cohen | G06T 7/0012 382/100 |
| 8,588,505 | B2* | 11/2013 | Bolea | G06K 9/00127 382/133 |
| 9,098,756 | B2* | 8/2015 | Endoh | G06K 9/00919 |
| 9,928,403 | B2* | 3/2018 | Cohen | G06K 9/00201 |
| 10,706,259 | B2* | 7/2020 | Cohen | G06T 7/0012 |
| 10,929,716 | B2* | 2/2021 | Cohen | G06N 3/08 |
| 11,068,694 | B2* | 7/2021 | Cohen | G06K 9/0014 |
| 2006/0050947 | A1* | 3/2006 | Petrou | G06T 7/0012 382/133 |
| 2006/0120603 | A1* | 6/2006 | Li | G06K 9/00127 382/181 |
| 2006/0228036 | A1* | 10/2006 | Avinash | G06T 5/003 382/254 |
| 2010/0263098 | A1* | 10/2010 | Muller | G01Q 30/04 850/33 |
| 2010/0268225 | A1* | 10/2010 | Coe | A61B 18/1477 606/42 |
| 2011/0141103 | A1* | 6/2011 | Cohen | G02B 21/367 345/419 |
| 2012/0155734 | A1* | 6/2012 | Barratt | G06T 7/344 382/131 |
| 2012/0236120 | A1* | 9/2012 | Kramer | G06K 9/00134 348/46 |
| 2013/0058524 | A1* | 3/2013 | Cohen | G06K 9/6253 382/103 |
| 2014/0348410 | A1* | 11/2014 | Grunkin | G01N 33/57415 382/133 |
| 2015/0085320 | A1* | 3/2015 | Palanivel | G06F 3/126 358/2.1 |
| 2016/0104290 | A1* | 4/2016 | Patnaik | G06T 7/12 382/173 |
| 2017/0213344 | A1* | 7/2017 | Hong | G06K 9/0014 |
| 2017/0228865 | A1* | 8/2017 | Cohen | G06K 9/00127 |
| 2018/0025231 | A1* | 1/2018 | Noh | G06K 9/00758 382/160 |
| 2018/0189953 | A1* | 7/2018 | Nie | G06T 7/11 |
| 2018/0247102 | A1* | 8/2018 | Cohen | G06K 9/0014 |
| 2020/0043192 | A1* | 2/2020 | Zhang | G06K 9/4609 |
| 2020/0082222 | A1* | 3/2020 | Cohen | G06N 3/084 |
| 2020/0234025 | A1* | 7/2020 | Cohen | G06K 9/6254 |
| 2020/0311377 | A1* | 10/2020 | Cohen | G02B 21/365 |
| 2021/0042522 | A1* | 2/2021 | Dias Bispo Carvalho | G06K 9/00624 |
| 2021/0182531 | A1* | 6/2021 | Chang | G01N 21/6428 |

FOREIGN PATENT DOCUMENTS

| | | |
|---|---|---|
| JP | 2014071207 A | 4/2014 |
| JP | 2015108837 A | 6/2015 |
| WO | 2014179269 A2 | 11/2014 |

OTHER PUBLICATIONS

Original and Translated first Office action for Chinese Patent Application CN 201780009222, dated May 25, 2021 (18 pages).
Original and translated Notice of Reasons for Refusal for Japanese Patent Application JP 2018-541336, dated Jan. 19, 2021 (13 pages).
Extended European Search Report for European Application No. EP 17750588, dated Sep. 26, 2019 (10 pages).
Communication pursuant to Article 94(3) EPC for Application No. 17750588, dated Jun. 18, 2021, Applicant Molecular Devices, LLC (7 pages).

* cited by examiner

| Row ID | ObjectID | Volume | DAPI Spheroid Int | FITC Int | Fe |
|---|---|---|---|---|---|
| 1 | 1 | 340797.53 | 726.03 | 726.03 | 1 |
| 2 | 3 | 300181.16 | 638.07 | 638.07 | 1 |
| 3 | 4 | 227519.54 | 707.6 | 707.6 | 1 |
| 4 | 7 | 259349.15 | 735.33 | 735.33 | 1 |
| 5 | 12 | 157808.24 | 728.37 | 728.37 | 1 |
| 6 | 17 | 360449.57 | 795.3 | 795.3 | 1 |
| 7 | 2 | 397656.76 | 749.47 | 749.47 | 1 |
| 8 | 6 | 716122.63 | 724.97 | 724.97 | 1 |
| 9 | 8 | 956847.53 | 829.91 | 829.91 | 1 |
| 10 | 18 | 1152064.85 | 641.48 | 641.48 | 1 |
| 11 | 19 | 1547445.78 | 698.47 | 698.47 | 1 |
| 12 | 9 | 1898489.16 | 793.79 | 793.79 | 1 |
| 13 | 10 | 1626590.79 | 811.73 | 811.73 | 1 |
| 14 | 11 | 584257.1 | 852.68 | 852.68 | 1 |
| 15 | 13 | 2348302.07 | 706.4 | 706.4 | 1 |
| 16 | 14 | 1535938.11 | 902.85 | 902.85 | 1 |
| 17 | 15 | 1799274.57 | 895.39 | 895.39 | 1 |
| 18 | 16 | 2114285.38 | 829.06 | 829.06 | 1 |
| 19 | 5 | 191679.68 | 626.33 | 626.33 | 1 |

FIG. 6C

SYSTEM AND METHOD FOR IMAGE ANALYSIS OF MULTI-DIMENSIONAL DATA

CROSS REFERENCE TO RELATED APPLICATIONS

The present application is a continuation of Cohen et al., U.S. patent application Ser. No. 15/897,699, filed on Feb. 15, 2018, and entitled "System and Method for Image Analysis of Multi-Dimensional Data"; which in turn is a continuation of Cohen, et al., U.S. application Ser. No. 15/019,411, filed Feb. 9, 2016, and entitled "System and Method for Image Analysis of Multi-Dimensional Data" and which issued as U.S. Pat. No. 9,928,403. The entire contents of these applications are incorporated herein by reference.

FIELD OF DISCLOSURE

The present subject matter relates to high-content imaging systems and more particularly, to a system to analyze multi-dimensional data generated using such systems.

BACKGROUND

A high-content imaging system (HCIS) may be used to obtain a microscopy image of a biological sample. Such image may include a number of cells against a background field. Further, the HCIS may be used to obtain a series of microscopy images of the biological sample, wherein, for example, each image is obtained using a different focus point. Such series of microscopy images may be combined to develop a three-dimensional view of the biological sample. Such series of microscopy images may also be analyzed to segment and identify a portion of each such image that is associated with a particular cell. Such portions may then be combined to form a three-dimensional view of the particular cell, analyzed further to identify organelles within the three-dimensional cell body, and/or develop three-dimensional statistics of the three-dimensional cell body and/or the organelles therein.

A researcher may want to obtain statistics of cells that are present in the microscopy image or series of microscopy images. Such statistics may include a count of how may cells of a particular cell type are present in the image, the range of sizes (e.g., dimensions, volumes and surface areas) of such cells, the mean, median and mode of the sizes of such cells, how well the cell conforms to particular shape (e.g., sphericity), and the like. Further, the images may be analyzed to identify organelles within cells identified in such images and the statistics of such organelles may also be developed. Before any such statistics can be calculated, cells in the microscopy image must be segmented from the background and also from any debris present in the microscopy image.

An interactive image analysis system may be used to specify a sequence of image analysis steps and parameters for each step. Examples of image analysis steps include, for example, select an image captured using a particular illumination source, threshold the image, and apply one or more filters to the image. Example filters may include unsharp mask, a smoothing filter, and the like. After the sequence of image analysis steps and corresponding parameters are specified, measurements may be taken of the image that results when the specified the image analysis steps are applied. Such measurements include a count of different types of objects (e.g., cells or components of cells) that are present in the resulting image. Cohen et al., U.S. Pat. No. 8,577,079, entitled "IMAGE PROCESSING SYSTEM PROVIDING SELECTIVE ARRANGEMENT AND CONFIGURATION FOR AN IMAGE ANALYSIS SEQUENCE," describes one such computer-implemented system for processing a selected image or series of images using multiple processing operations. The entire contents of this patent are incorporated herein by reference.

SUMMARY

According to one aspect, a computer-implemented system for analyzing a biological sample includes one or more processors and executable code stored in one or more non-transitive storage devices. The executable code, when executed, causes the one or more processors to receive a sequence of images of the biological sample from an image capture device, wherein each image of the sequence of images is acquired at a particular focal plane of the biological sample. In addition, execution of the code causes the one or more processors to develop an object map from the sequence of images and analyze the object map to measure a three-dimensional characteristic of the particular object. The object map comprises a plurality of object map planes, each object map plane is associated with one image of the sequence of images, and pixels of the object map planes associated with a particular object in the sequence of images are assigned a unique identifier associated with the particular object.

According to another aspect, a method for analyzing a biological sample includes receiving from an image capture device a first sample image and a second sample image, wherein the first and second sample images are images of the biological sample acquired at first and second focal planes, respectively, thereof. The method also includes analyzing the first sample image to identify first connected pixels of the first sample image, wherein the first connected pixels are associated with an object, and analyzing the second sample image to identify second connected pixels of the second sample image that at least partially overlap the first connected pixels, wherein the second connected pixels are associated with the object. Further, the method includes associating third connected pixels of a first object map plane with an identifier, associating fourth connected pixels of a second object map plane with the identifier, and measuring a three-dimensional characteristic of the object in accordance with the first and second object map planes. The first object map plane is associated with the first sample image, the third connected pixels correspond to the first connected pixels, and the identifier is associated with the object. Further, the second object map plane is associated with the second sample image and the fourth connected pixels correspond to the second connected pixels.

Other aspects and advantages will become apparent upon consideration of the following detailed description and the attached drawings wherein like numerals designate like structures throughout the specification.

BRIEF DESCRIPTION OF THE DRAWINGS

FIG. 6C is an example table of measurements generated by the image analysis module in accordance with the image analysis step specified by the screen of FIG. 6A.

DETAILED DESCRIPTION

Figure 1:
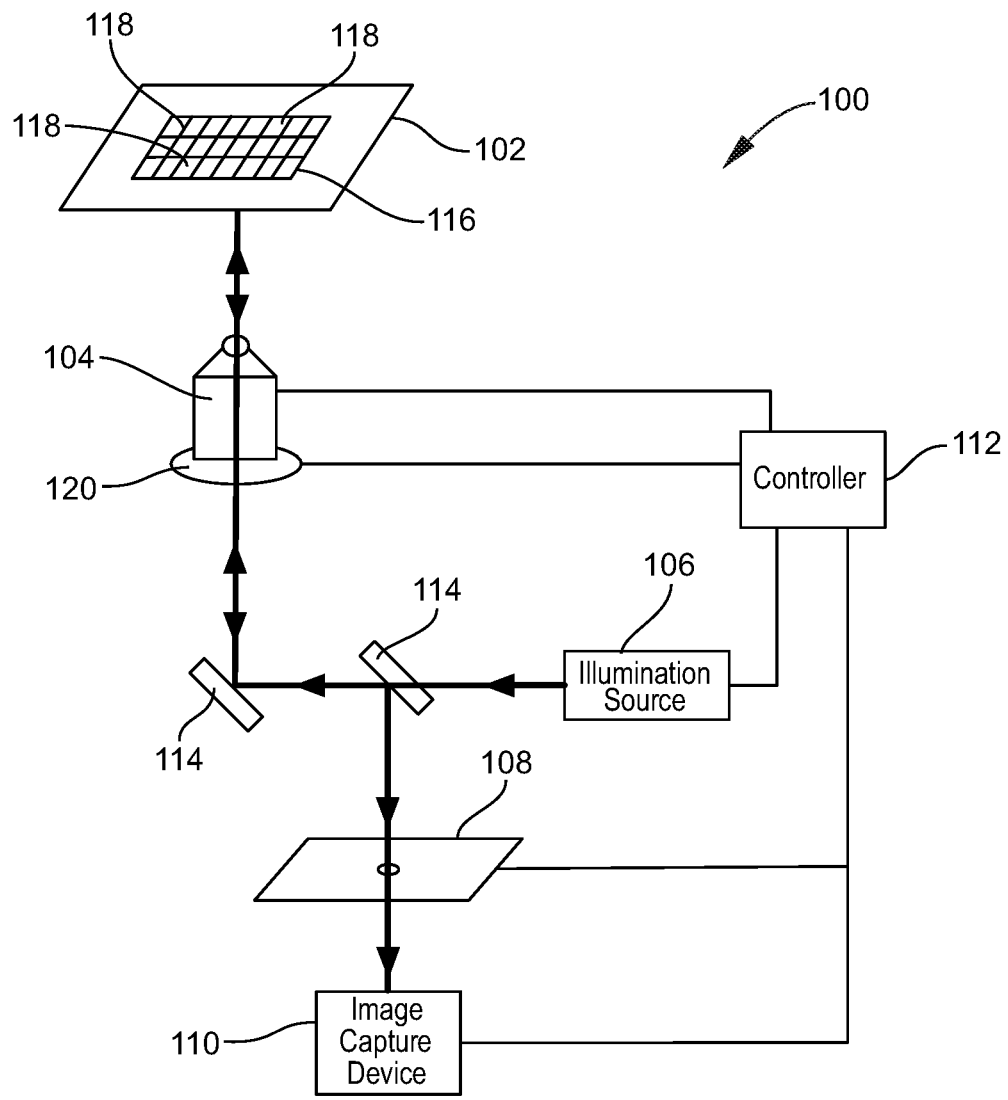
FIG. 1 is a block diagram of a high-content imaging system in accordance with the present disclosure.

Referring to FIG. 1, as will be apparent to those who have skill in the art, an HCIS 100 may include an X-Y stage 102, one or more objective lenses 104, one or more illumination sources 106, one or more filters 108, an image capture device 110, and a controller 112. The HCIS 100 may also include one or more mirrors 114 that direct light from the illumination source 106 to a sample tray 116 that may be disposed on the X-Y stage 102, and from such sample tray 116 to the image capture device 110. Typically, the sample tray 116 includes a plurality of wells 118, and samples (for example, biological cells) to be imaged by the HCIS 100 may be disposed in each such well 118.

Although, FIG. 1 shows the light from the illumination source 106 reflected from sample tray 116 reaching the image capture device 110, it should be apparent that additional mirrors (not shown) may be used so that light from the illumination source 106 is transmitted through the sample tray 116 and directed toward the image capture device 110. Further, it should be apparent that in some cases no illumination from the illumination source 106 may be necessary to image the samples in the sample tray 116 (for example, if the samples emit light or if the samples include radioactive components). In some embodiments, light from the illumination source may be transmitted through the samples in the sample tray 116, and the samples refract and/or absorb the transmitted light to produce light that is imaged.

During operation, the sample tray 116 may be placed, either manually or robotically, on the X-Y stage 102. In addition, the controller 112 may configure the HCIS 100 to use a combination of a particular objective lens 104, illumination generated by the illumination source 106, and/or filter 108. For example, the controller 112 may operate positioning devices (not shown) to place a selected objective lens 104 and, optionally, a selected filter 108 in the light path between the sample tray 116 and the image capture device 110. The controller 112 may also direct the illumination source 106 to illuminate the sample tray 116 with particular wavelengths of light. The samples in the sample tray 116 may contain molecules that fluoresce, either naturally occurring molecules, or molecules produced or present within the samples due to treatment. The wavelength illuminating the sample may be the excitation wavelengths associated with such fluorescent molecules, and the imaging capture device will capture only the emission spectrum of such fluorescent materials. One or more wavelengths may used serially or simultaneously to illuminate the same samples and produce images.

To obtain a series of images at different focal positions, the controller 112 operates a focus mechanism 120 so that the image capture device 110 may obtain in-focus images of the sample disposed in the sample tray 116 at each such focal position.

Figure 2:
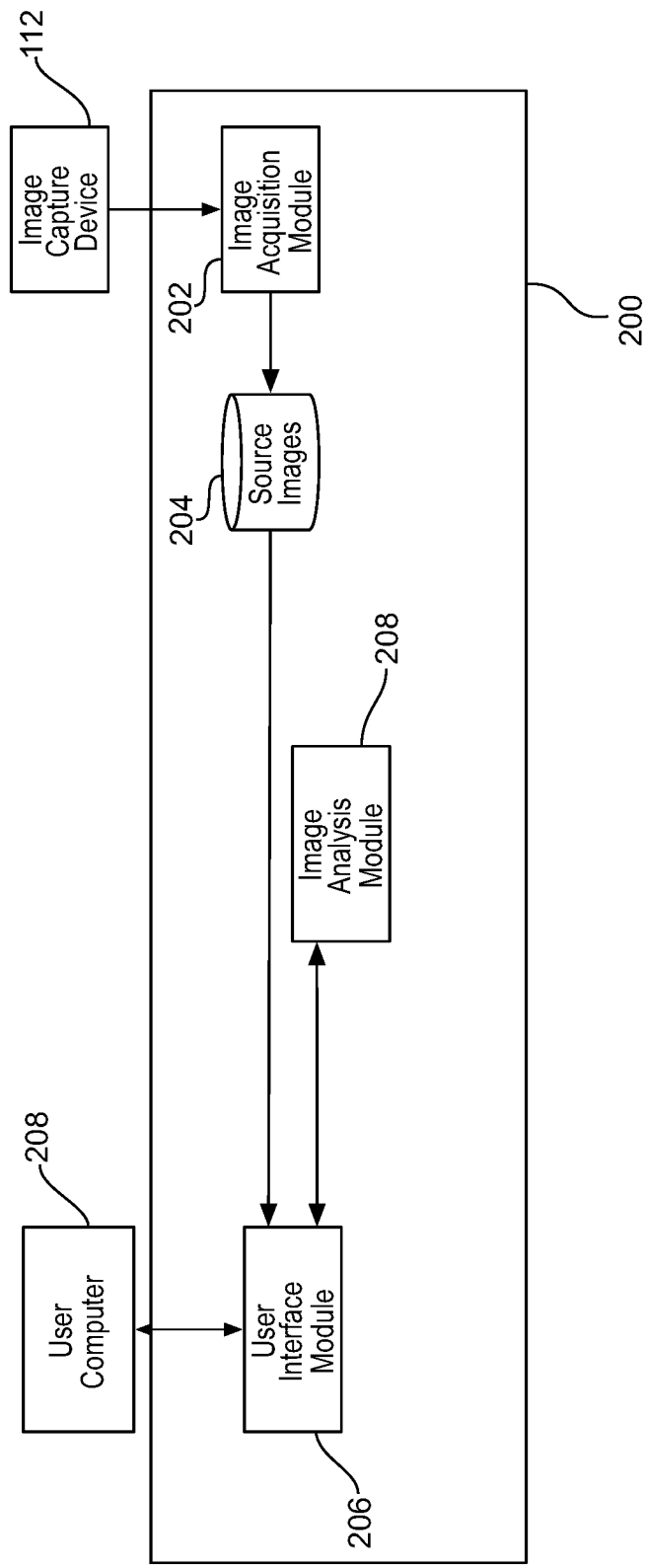
FIG. 2 is a block diagram of an image analysis system for analyzing multi-dimensional images captured using the high-content imaging system of FIG. 1.

Referring to FIG. 2, a multi-dimensional image analysis system 200 for specifying a sequence of image analysis steps for processing two-dimensional and three-dimensional images from an HCIS 100 includes an image acquisition module 202 in communications with the image capture device 112 of the HCIS 100.

The image acquisition module 202 directs the controller 112 to capture a series of images of a biological sample at various focal positions. In one embodiment, the image acquisition module 202 may direct the controller 112 to operate the focus mechanism 120 and the image capture device 112 to capture a series of between 10 and 150 successive images of the sample. To obtain a low-resolution three-dimensional representation of the sample, the image acquisition module 202 may direct the controller 112 to adjust the focal position by approximately 50 microns between successive images. To obtain a high-resolution three-dimensional representation of the sample, the image acquisition module 202 may direct the controller 112 to adjust the focal position by between approximately 3 microns and 5 microns between successive images. For an even, higher-resolution three-dimensional representation of the sample, the image acquisition module 202 may direct the controller 112 to adjust the focal position by between 0.5 microns and 1 micron between successive images.

Further, the image acquisition module 202 may direct the controller to capture multiple series of images, wherein each series of images is captured using a different combination of an illumination source 106, filter 108, and objective lens 104.

The image acquisition module 202 receives each series of successive source images of the sample from the image capture device 112 and stores such images in a source images data store 204. Each series of source images may be considered a three-dimensional representation of the volume that includes the biological sample, and each source image of the series may be considered a two-dimensional plane (or slice) of the three-dimensional volume. The biological sample may include one or more cells. Larger cells may be represented in all of the planes of the three-dimensional representation, and smaller cells may be represented in only some planes of the three-dimensional representation.

After the series of source images are stored in the source images data store 204, a user interface module 206 allows an operator to use a user computer 208 to select one or more of the series of source images. The selected series is displayed on the screen of the user computer 208. The user may specify to the user interface module 206, a sequence of three-dimensional and two-dimensional image analysis steps to perform on the displayed series of images. An image or series of images that is developed after the sequence of image analysis steps have been undertaken is displayed on the screen of the user computer 208.

Figure 3A:
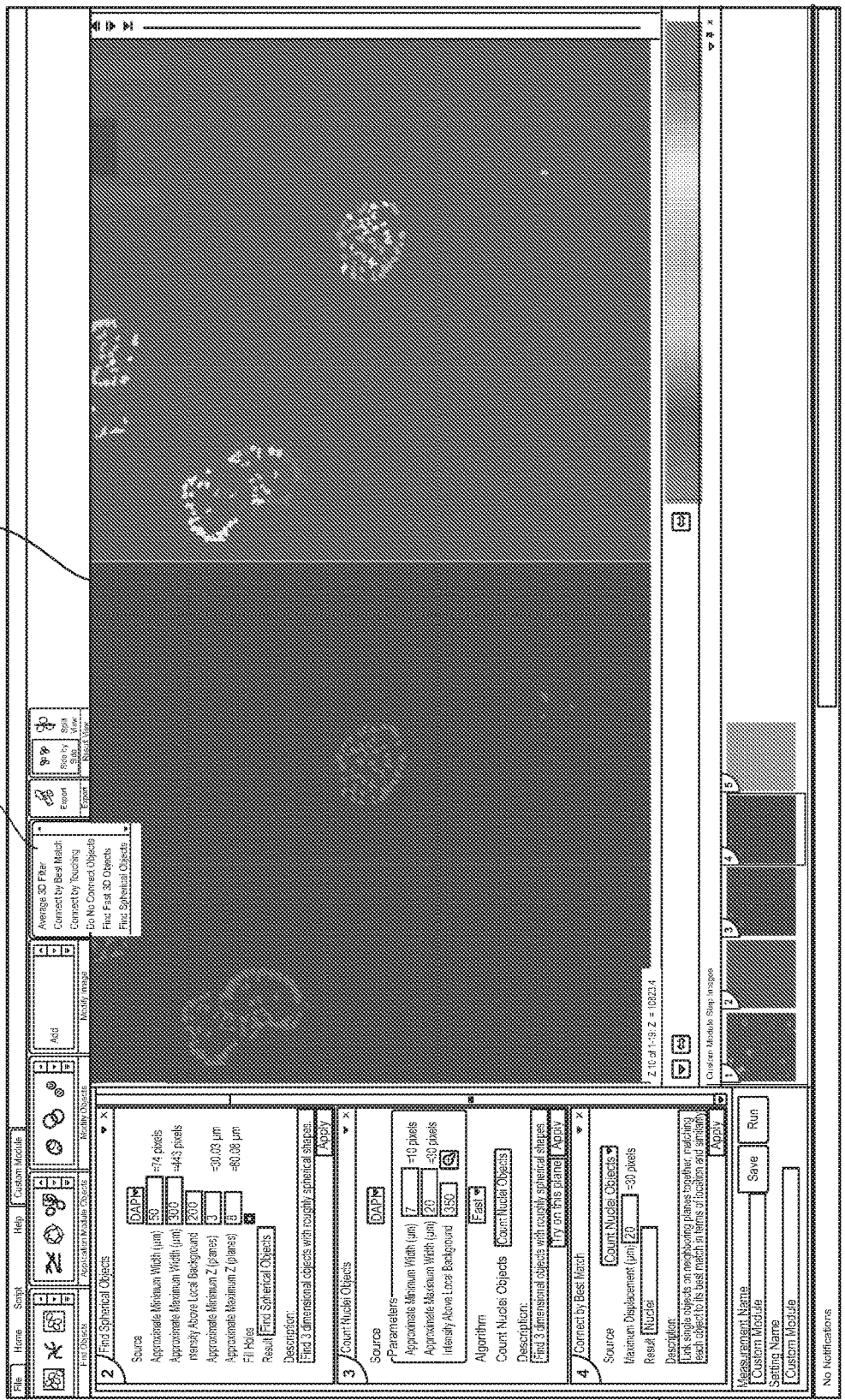
FIGS. 3A-3C are screens displayed by the image analysis system of FIG. 2.
Figure 3B:
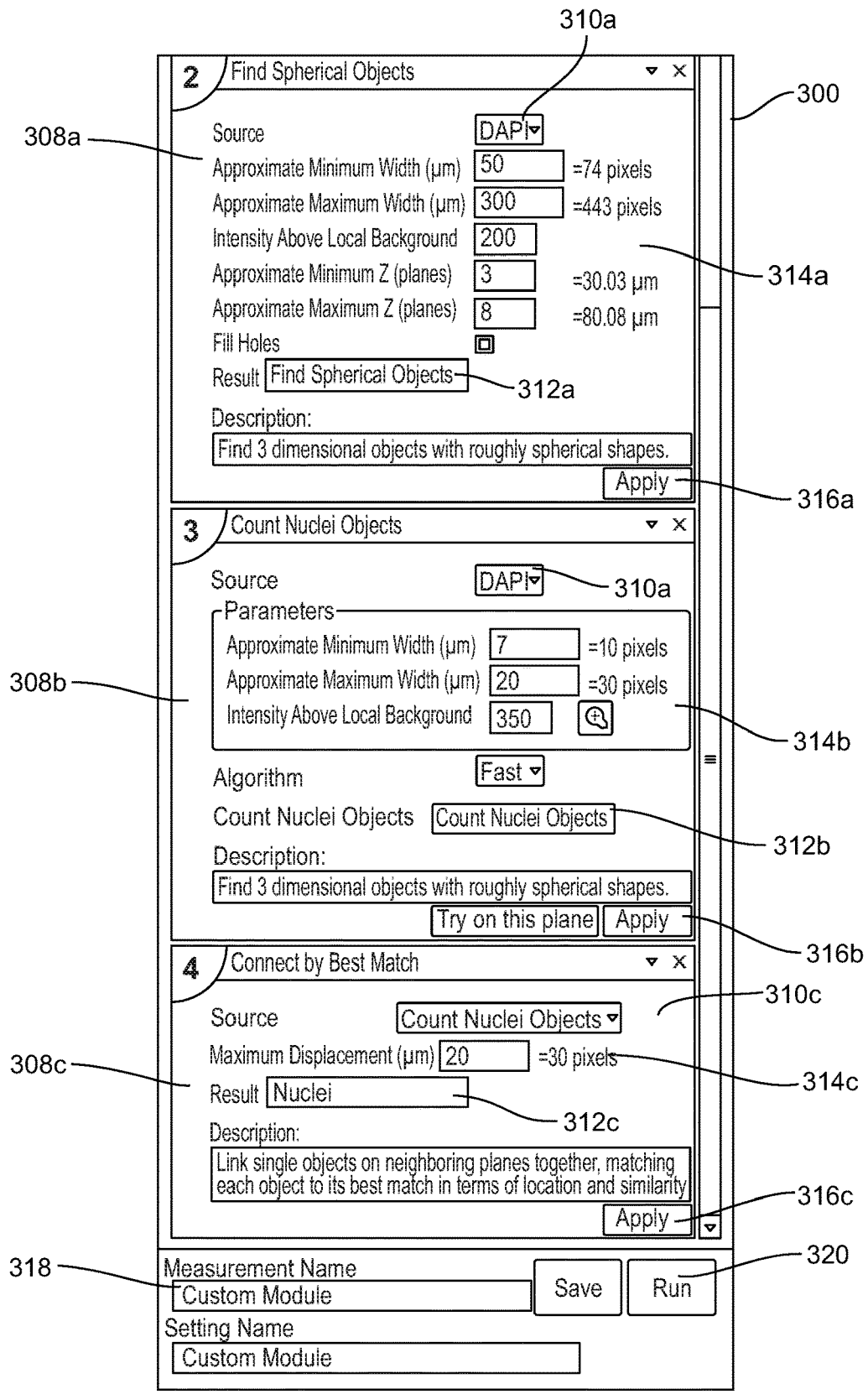
Figure 3C:
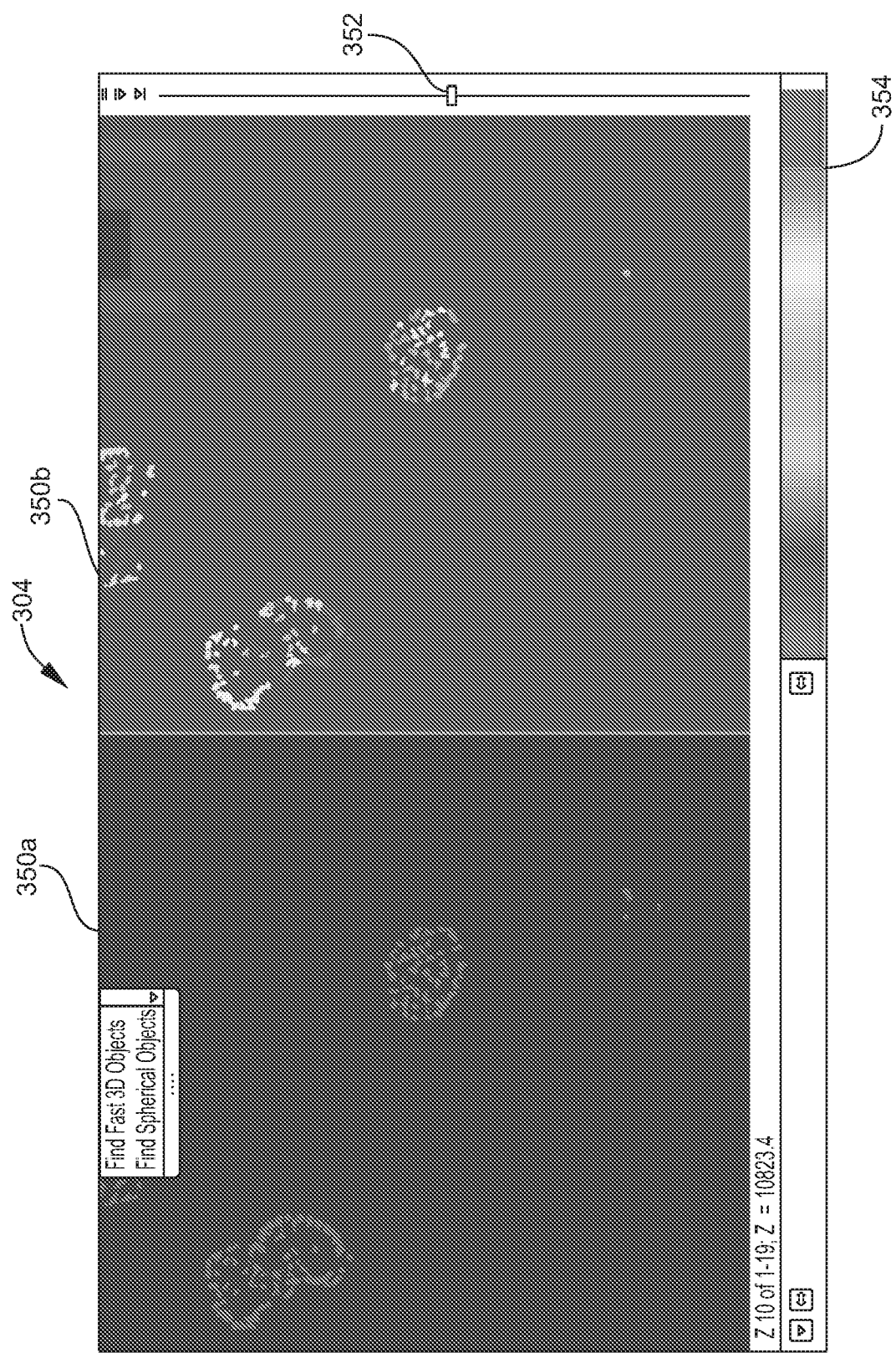

Referring to FIGS. 3A-3C, the user interface module 206 displays on the screen 300 of the user computer 208 a region 302 in which panels for specifying image analysis steps may be displayed, a region 304 in which one or more images may be displayed, and a menu 306 of available image analysis steps.

Referring to FIG. 3B, selecting a menu item in the menu 306 displays a corresponding panel 308. Each panel is associated with a particular image analysis step. The panel includes a pop-up menu 310 from which an input (or source) plane or a series of images may be selected. The panel also includes a text box 312 in which the user may enter an identifier associated with an output (or result) plane or series of images that result from applying the particular image analysis step to the selected input plane or series of images.

The pop-up menu 310 presents identifiers associated with each series of images captured by the image capture device using different imaging parameters or the identifier associated with the output of another panel 308.

Each panel 308 also includes one or more text-boxes and/or selection boxes 314 to specify parameters associated with the particular image analysis step specified using such panel 308. For example, the panel 308a is associated with an image analysis step of "Find Spherical Objects," and uses as input a series of images associated with an identifier DAPI (310a). The panel includes text boxes 314 for specifying a minimum and maximum width of spherical objects, and intensity of such objects compared to the background, and a minimum and maximum number of planes each identified object may span. The result of applying the image analysis step specified by the panel 308a is associated with an output series of images named "Find Spherical Objects" (312a).

Further, the panel 308b is associated with an image analysis step of "Count Nuclei Objects" also in the series of images associated with the identifier DAPI (310b). The result of the panel 308b is associated with the identifier "Count Nuclei Objects" (312b).

The panel 308c uses as an input an image associated with the identifier "Count Nuclei Objects" (310c), which is the output of the image analysis step specified by the panel 308b, and generates an output series of images associated with an identifier "Nuclei" (312c).

Because the inputs of the panel 308a and 308b do not depend on one another, the system 200 may undertake the image analysis steps identified by such panels concurrently. The system 200 undertakes the image analysis steps identified by the panel 308c only after the output of the panel 308b is available.

Further, for example, the panels 308a and 308c specify three-dimensional image analysis steps that require analysis across image planes because these image analysis step analyze information from multiple image planes in concert to produce a result. In contrast, the panel 308b specify a two-dimensional image analysis steps that analyzes each plane of the series separately.

For example, the count nuclei image analysis step specified by panel 308b analyzes the pixels in an image plane to separate pixels that are associated with an object from pixels that are part of the background. The image may be processed (for example, smoothed, thresholded, and analyzed) to associate connected pixels that are too small with the background and break up connected pixels that specify one object that is too large into separate objects. Each image plane may be processed independently in accordance with the image analysis step specified by panel 308b.

In contrast, the connect by best match image analysis step specified by panel 308c analyzes multiple planes to identify object pixels in such planes that are all associated with the same object in three dimensions. In particular, the connect by best match image analysis step identifies pixels that are connected across image planes and associates such identified pixel with the same object. In one embodiment, the connect by best match image analysis step associates an object-id with each object in an image plane identified by the count nuclei image analysis step. An object map image plane is created from each image plane in the series of images, and the value each pixel of the object map image plane that corresponds to an object pixel in the image plane is set to object-id of the object.

Thereafter, pixels associated with an object in each object map image plane are compared to pixels associated with objects in other object map image planes to determine if such pixels of these different planes are associated with the same object (i.e., connected across planes). If so, these pixels of the different planes are assigned the same object id. The result of such analysis is an object map series of images that identifies individual objects in the captured series of image in three dimensions. Such object map series of images may be analyzed to measure three-dimensional characteristics (such as sphericity, shape, volume, and the like) of the objects of the captured series of images.

First connected pixels in a first object map image plane and second connected pixels in a second object map image plane may be associated with the same object (and assigned the same object-id) if the first and second connected pixels at least partially overlap. Additionally, the first and the second connect pixels may be considered to be associated with the same object if such pixels are within a predetermined distance (in three-dimensions) from one another and if the differences in intensities of the corresponding pixels in the series of images are within a predetermined threshold.

Further, the object map series of images may be analyzed to make sure that connected pixels in each object map plane is associated with at most one object. Further, if the first pixels of the first object map plane and second pixels of the second object plane are associated with a particular object (i.e., have the same object id) and if there are more than a predetermined number of intervening planes between the first and the second object map planes that do not have any pixels associated with the particular object, the first pixels and second pixels will be associated with different objects (i.e., given different object-ids). As should be apparent, the image analysis step specified by the panel 308c requires analysis of multiple image planes, and each image plane may not be processed independently from other image planes.

Referring to FIG. 3C, the user-interface displays in the region 304 the results of the image analysis steps specified in the region 300. Applying the series of image analysis steps results in one or more image processed series of images, and one plane of such image-processed series of images is displayed in one or more corresponding regions 350. In some embodiments, the user may hide the results of particular image processing steps, determine if only one image plane is displayed, or specify display of a composite image generated from the series of image planes.

A slider 352 is also displayed, for example, adjacent to one of the images displayed in the regions 304. Adjusting the slider 352 by one unit upward displays subsequent plane from the series of source images in the region 304. If multiple planes, each from a different series of images, are displayed in the region 304, adjusting the slider 352 selects a subsequent or preceding plane of each such series to display. Similarly, adjusting the slider 306 downward displays preceding planes in the panels 302 and 304.

A threshold slider 354 may be displayed adjacent to some images displayed in the region 300, and adjusting such slider 354 dynamically adjusts the brightness of the displayed image based on intensity.

Each panel 308 includes a button 316 and selecting such button immediately undertakes the image-processing step specified by such panel. If such image-processing step requires an input that is an output of another panel to be generated, the image processing system 200 generates such output. The image or series of images that results from such image-processing step is displayed immediately in the region 304 of the screen 300 of the user computer 208. In this manner, the user may interactively adjust parameters and select the order in which multiple image-processing steps are undertaken in two-dimensions and three-dimensions to analyze the biological sample.

Referring once again to FIG. 3B, the image analysis steps defined in the region 300 may be associated with an identifier using the text box 318 and saved. All of the image analysis steps defined in the 300 may executed by selecting a button 320. Further, such image analysis steps may be executed without update to the images displayed in the region 304 (i.e., in a batch mode) to process one or more series of images captured using the HCIS 100.

Referring to FIGS. 2 and 3B, when the user presses the button 316 or the button 320 the user interface module 206 provides the specified image analysis steps and the user supplied parameters associated with such steps to the image analysis module 208.

Figure 4:
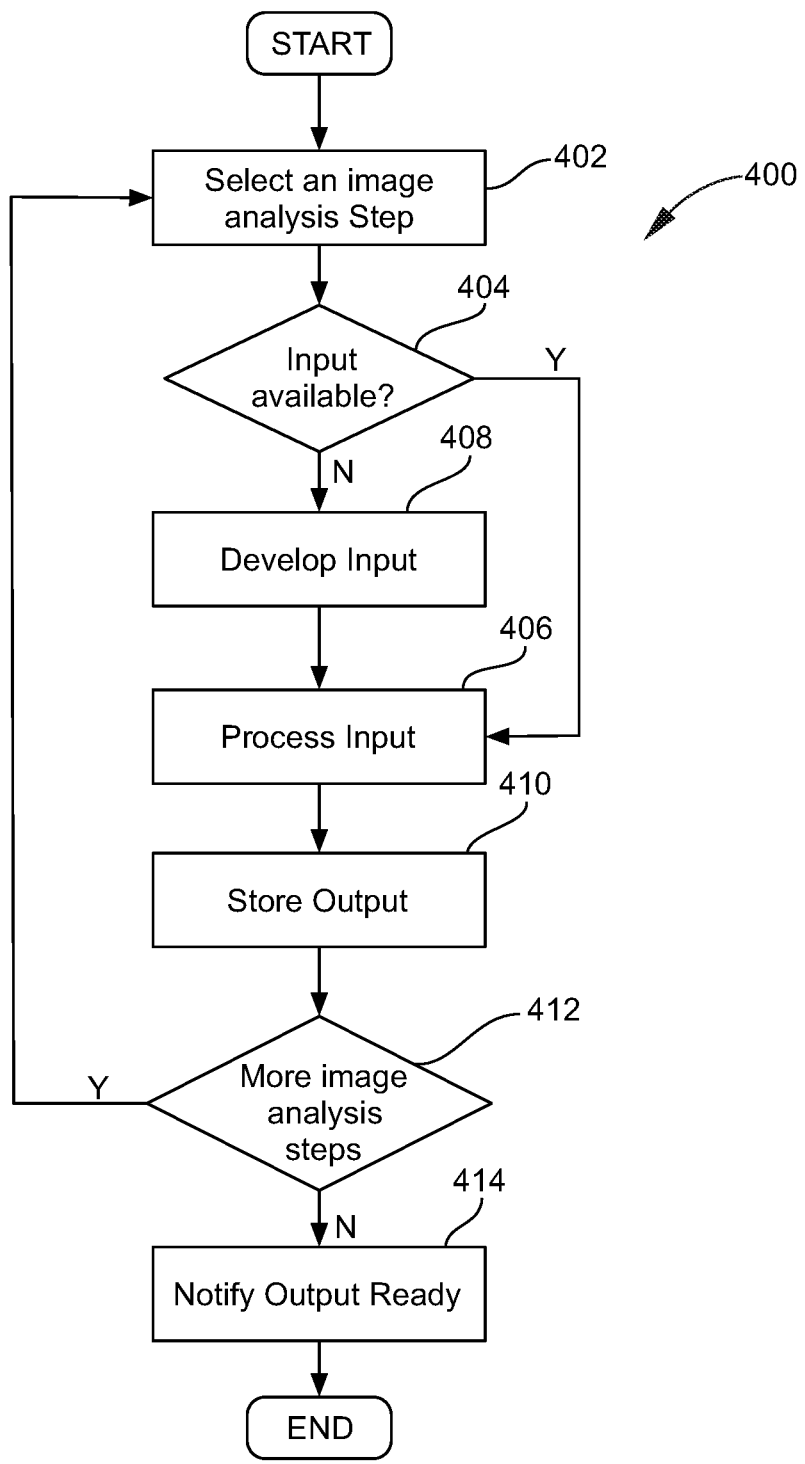
FIG. 4 is a flowchart of processing undertaken by an image analysis module of the image analysis system of FIG. 2.

FIG. 4 illustrates a flowchart 400 of the steps undertaken by the image analysis module 208. At step 402, the image analysis module 208 selects one of the steps specified by the user. At step 404, the image analysis module 208 determines if the input image or series of images is available (i.e., has been created). If so, the image analysis module 208 proceeds to step 406. Otherwise, at step 408, the image analysis module 208 undertakes the image analysis step necessary to develop the input, and then proceeds to step 406.

At step 406, the image analysis module 208 processes the input in accordance with the parameters associated with the image analysis step selected at step 402. At step 410, the image analysis module 208 stores the results of undertaking the image analysis step. At step 412, the image analysis module 208 determines if there are any image analysis steps specified by the user that have not been undertaken, and if so, proceeds to step 402. Otherwise the image analysis module 208 notifies the user interface module that the output image or series of images are ready, at step 414, and exits.

Figure 5:
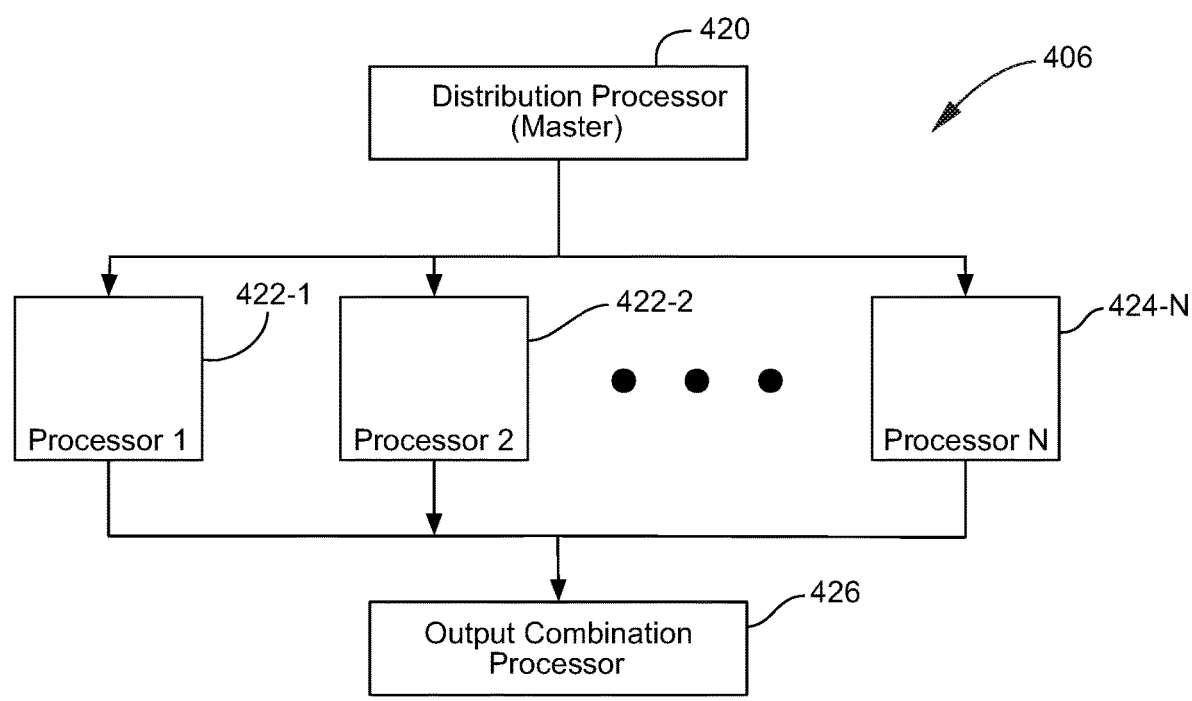
FIG. 5 is a block diagram of an embodiment of an image analysis module of the image analysis system of FIG. 2.

Referring also to FIG. 5, some image processing steps may be parallelizable. In such cases, at step 208, a distribution processor 420 of the image processing module 208 may supply the image processing function associated with the image processing step and the parameters of the image processing step to each one of a plurality of processors 422. In addition, the distribution processor 420 may assign a unique portion of the input (either a plane of a series of images or a portion of a plane) to each one of a plurality of processors 422. The plurality of processors 422 undertake the image analysis step on the unique portion of the input assigned thereto and provide the result of such image analysis step to an output combination processor 424. The output combination processor 424 combines the output generated by each processor 422 to create the output of the image analysis step.

Figure 6A:
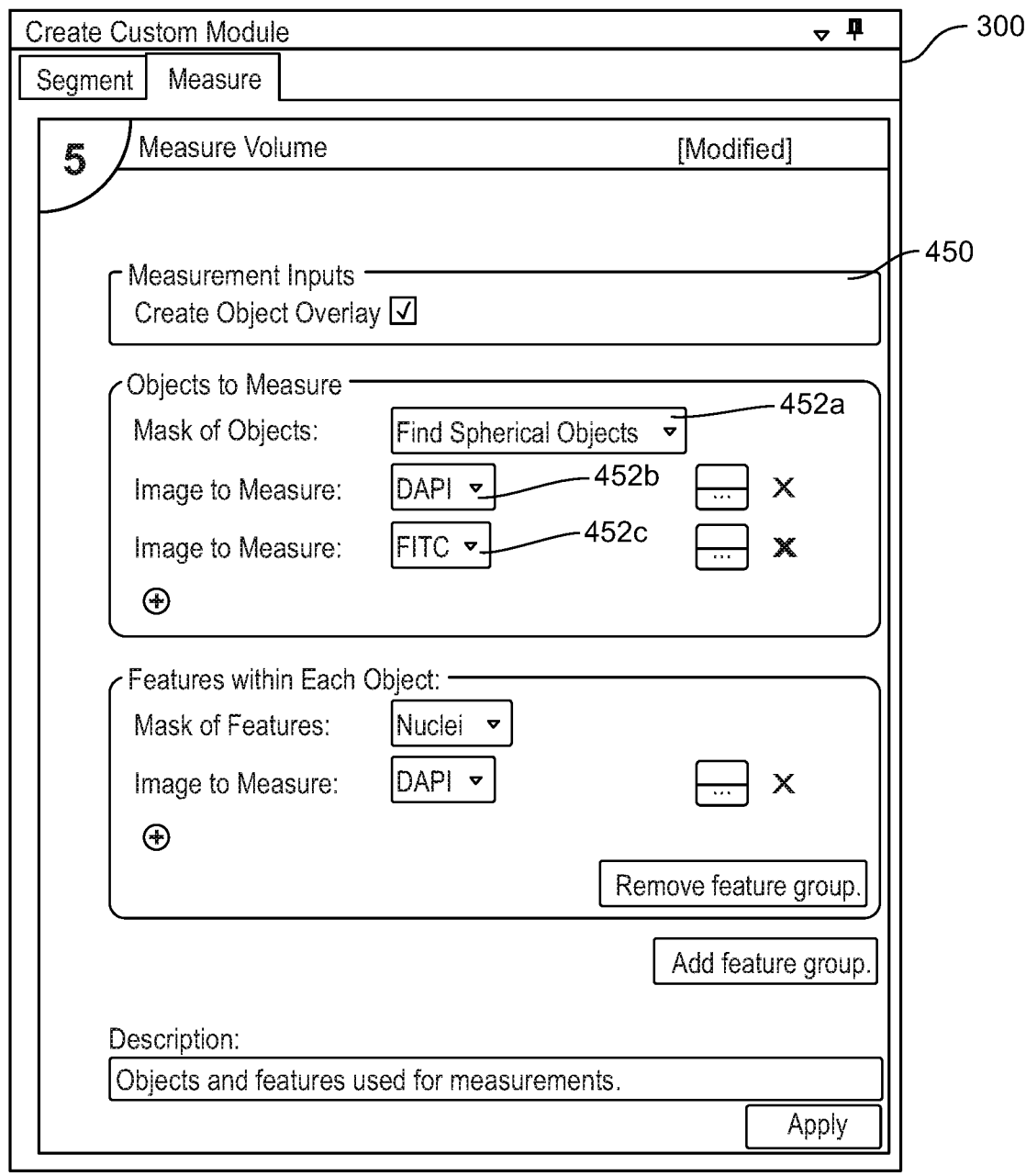
FIG. 6A is a portion of a screen displayed by the image analysis system of FIG. 2 that allows specification of an image analysis step.
Figure 6B:
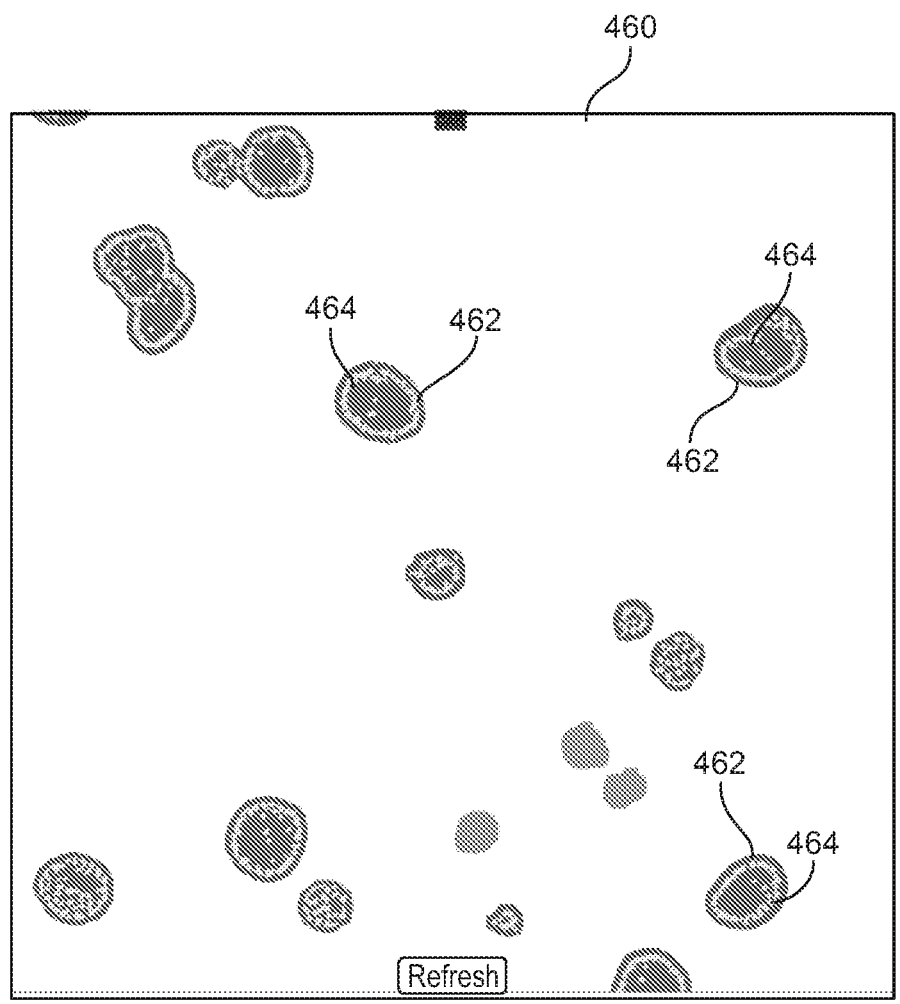
FIG. 6B is an example image generated by the image analysis module in accordance with the image analysis step specified by the screen of FIG. 6A.

The image analysis system 200 may allow the user to specify multiple input sources to use in an image analysis step. Referring to FIGS. 6A and 6B, a panel 450 associated with a measure volume image analysis step that includes three pull down menus 452a, 452b, and 452c. The pull down menu 452a specifies a first input to this image analysis step to be the output of the image analysis step specified using the panel 308a (FIG. 3B), the pull down menu 452b species a second input to be DAPI, and the pull down menu 452c specifies a third input to be FITC. In this example, DAPI and FITC are different imaging conditions under which separate series of images of the biological sample were captured. The DAPI series of images may be used to identify cell or spheroids of cells. The FITC series of image may be used to identify nuclei within cells.

The image analysis step specified in the panel 450 applies the input specified using the pull down menu 452a as a mask to the inputs specified using the pull down menu 450b and 450c to identify both object and nuclei in such objects. In this example, each plane of the series "Find Spherical Objects" selected using the pull-down menu 452a is masked with both a corresponding plane of the series "DAPI" selected using the pull-down menu 452b and a corresponding plane of the series "FITC" selected using the pull-down menu 452c. The corresponding planes of the two series of images that result from the two masking operations are merged into a single plane of an output of series of images that results from this step.

FIG. 6B shows an example of an image 460 that may be generated and displayed in the region 304 of the display of the user computer 208 after undertaking the image analysis step specified using the panel 450. As shown in the image, objects 462 and sub-objects 464 within such objects 462 have been identified.

The panel 450 also generates a table shown in FIG. 6C of the volumes of the objects identified in the FIG. 6B. Such table may also be displayed on the display of the user computer 208 or downloaded thereto.

Examples of three-dimensional image processing steps that may be specified using the panels described above include apply Mean, Gaussian, and similar filters in three-dimensions; convolve a three-dimensional kernel with a series of images that represent an three-dimensional volume; apply a two-dimensional mask to each plane of a series of images that represent a three-dimensional volume; generate a three-dimensional object map wherein a unique pixel intensity in each plane of a series of output images is associated with a unique object in a series of images; identify pixels of a first object and a second object in corresponding first and second adjacent planes that overlap or are adjacent across planes, and associate the pixels of the first object and the second object with a same unique identifier; crop a volume represented in a series of images to reduce the size of the input for further image analysis steps; connect objects between adjacent planes; and the like.

Examples of measurements that may be taken using three-dimensional image processing steps that may be specified using the panels described above include measure volumes of three-dimensional objects, classify shapes of three-dimensional objects, measure a distance in three-dimensions between objects, measure distance in three-dimensions between a feature of an object and a center of such object, and the like.

It should be apparent, that the series of images described herein above may be a series of images taken over time, and time instead of volume analysis may be undertake using the image analysis system 200. Such analysis may be used to automatically track the position and velocity of an object in the field of view of the image capture device 110. Further, characteristics such as size, intensity, shape and similar features as the object moves in the field of view and changes in such characteristics may also be measured using the image analysis system 200 described above.

It should be apparent to those who have skill in the art that any combination of hardware and/or software may be used to implement the image analysis system described herein. It will be understood and appreciated that one or more of the processes, sub-processes, and process steps described in connection with FIGS. 1-6C may be performed by hardware, software, or a combination of hardware and software on one or more electronic or digitally-controlled devices. The software may reside in a software memory (not shown) in a suitable electronic processing component or system such as, for example, one or more of the functional systems, controllers, devices, components, modules, or sub-modules schematically depicted in FIGS. 1-6C. The software memory may include an ordered listing of executable instructions for implementing logical functions (that is, "logic" that may be implemented in digital form such as digital circuitry or source code, or in analog form such as analog source such as an analog electrical, sound, or video signal). The instructions may be executed within a processing module or controller (e.g., the image acquisition module 202, the user interface module 206, and the image analysis module 208 of FIG. 2), which includes, for example, one or more microprocessors, general purpose processors, combinations of processors, digital signal processors (DSPs), field programmable gate arrays (FPGAs), or application-specific integrated circuits (ASICs). Further, the schematic diagrams describe a logical division of functions having physical (hardware and/or software) implementations that are not limited by architecture or the physical layout of the functions. The example systems described in this application may be implemented in a variety of configurations and operate as hardware/software components in a single hardware/software unit, or in separate hardware/software units.

The executable instructions may be implemented as a computer program product having instructions stored therein which, when executed by a processing module of an electronic system, direct the electronic system to carry out the instructions. The computer program product may be selectively embodied in any non-transitory computer-readable storage medium for use by or in connection with an instruction execution system, apparatus, or device, such as a electronic computer-based system, processor-containing system, or other system that may selectively fetch the instructions from the instruction execution system, apparatus, or device and execute the instructions. In the context of this document, computer-readable storage medium is any non-transitory means that may store the program for use by or in connection with the instruction execution system, apparatus, or device. The non-transitory computer-readable storage medium may selectively be, for example, an electronic, magnetic, optical, electromagnetic, infrared, or semiconductor system, apparatus, or device. A non-exhaustive list of more specific examples of non-transitory computer readable media include: an electrical connection having one or more wires (electronic); a portable computer diskette (magnetic); a random access, i.e., volatile, memory (electronic); a read-only memory (electronic); an erasable programmable read only memory such as, for example, Flash memory (electronic); a compact disc memory such as, for example, CD-ROM, CD-R, CD-RW (optical); and digital versatile disc memory, i.e., DVD (optical).

It will also be understood that receiving and transmitting of signals or data as used in this document means that two or more systems, devices, components, modules, or sub-modules are capable of communicating with each other via signals that travel over some type of signal path. The signals may be communication, power, data, or energy signals, which may communicate information, power, or energy from a first system, device, component, module, or sub-module to a second system, device, component, module, or sub-module along a signal path between the first and second system, device, component, module, or sub-module. The signal paths may include physical, electrical, magnetic, electromagnetic, electrochemical, optical, wired, or wireless connections. The signal paths may also include additional systems, devices, components, modules, or sub-modules between the first and second system, device, component, module, or sub-module.

INDUSTRIAL APPLICABILITY

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar references in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

Numerous modifications to the present disclosure will be apparent to those skilled in the art in view of the foregoing description. It should be understood that the illustrated embodiments are exemplary only, and should not be taken as limiting the scope of the disclosure.

We claim:

1. A computer-implemented system for analyzing a biological sample includes one or more processors and executable code stored in one or more non-transitive storage devices, the executable code, when executed, causes the one or more processors to:

receive a sequence of images of the biological sample from an image capture device, wherein each image of the sequence of images is acquired at a particular focal plane of the biological sample;

develop an object map from the sequence of images, wherein the object map comprises a plurality of object map planes and each object map plane is associated with one image of the sequence of images;

determine pixels of the plurality of object map planes that are associated with a particular object represented in the sequence of images; and set values of the determined pixels to a unique identifier associated with the particular object; and analyze the object map to measure a three-dimensional characteristic of the particular object.

2. The computer-implemented system of claim 1, wherein to determine the pixels, the executable code causes the one or more processors to identify first connected pixels and second connected pixels in first and second object map planes of the plurality of object map planes that at least partially overlap, wherein the first and second connected pixels include the determined pixels.

3. The computer-implemented system of claim 2, wherein the executable code causes the one or more processors to identify first connected pixels associated with object pixels in a first image of the sequence of images and second connected pixels associated with object pixels in a second image of the sequence of images in parallel.

4. The computer-implemented system of claim 3, wherein an area occupied by the identified first connected pixels in the first image is less than a predetermined amount and the executable code causes the one or more processors to associate the identified first connected pixels with a background.

5. The computer-implemented system of claim 3, wherein the particular object comprises a first object of one or more objects in the sequence of images and the unique identifier comprises a first unique identifier, and an area occupied by the identified first connected pixels in the first image is larger than a predetermined amount and the executable code causes the one or more processors to separate the first connected pixels in the first image into third connected pixels and fourth connected pixels, and associate pixels of the object map plane that are associated with the third connected pixels with the first unique identifier and pixels of the object map plane that are associated with the fourth connected pixels with a second unique identifier associated with a second object.

6. The computer-implemented system of claim 3, wherein the sequence of images comprises a first sequence of images acquired using first imaging conditions, and the executable code causes the one or more processors to receive a second sequence of images of the biological sample acquired using second imaging conditions and analyze the first and the second sequences of images to identify the first and second connected pixels.

7. The computer-implemented system of claim 1, wherein the particular object comprises one or more objects in the sequence of images, and the executable code causes the one or more processors to identify a first plurality of pixels in each image of the sequence of images that are associated with the one or more objects from a second plurality of pixels associated with a background.

8. The computer-implemented system of claim 1, wherein the image capture device is a component of a high-content imaging system.

9. The computer-implemented system of claim 1, further including a graphical user interface that receives a request to perform an image analysis operation and in response the executable code causes the one or more processors to develop the object map.

10. A method for analyzing a biological sample, comprising:
receiving from an image capture device a first sample image and a second sample image, wherein the first and second sample images are images of the biological sample acquired at first and second focal planes, respectively, thereof;
analyzing the first sample image to identify first connected pixels of the first sample image, wherein the first connected pixels are associated with an object;
analyzing the second sample image to identify second connected pixels of the second sample image that at least partially overlap the first connected pixels, wherein the second connected pixels are associated with the object;
setting values of third connected pixels of a first object map plane to an identifier, wherein the first object map plane is associated with the first sample image, the third connected pixels correspond to the first connected pixels, and the identifier is associated with the object;
setting values of fourth connected pixels of a second object map plane with the identifier, wherein the second object map plane is associated with the second sample image and the fourth connected pixels correspond to the second connected pixels; and
measuring a three-dimensional characteristic of the object in accordance with the first and second object map planes.

11. The method of claim 10, wherein the object and the identifier comprise a first object and a first identifier, respectively, and further including the steps of:
receiving from the image capture device a third sample image that is an image of the biological sample acquired at a third focal plane, wherein the second focal plane is intermediate the first and third focal planes;
analyzing the third sample image to identify fifth connected pixels thereof that are associated with object pixels; and
associating sixth connected pixels of a third object map plane with the first identifier if the fifth connected pixels at least partially overlap the first and the second connected pixels and with a second identifier associated with a second object if the fifth connected pixels do not at least partially overlap the first and the second connected pixels;
wherein the step of measuring the three-dimensional characteristic includes the step of measuring the three-dimensional characteristic in accordance with the first object map plane, the second object map plane, and the third object map plane.

12. The method of claim 10, wherein the three-dimensional characteristic includes one of sphericity, shape, and volume of the object.

13. The method of claim 10, further including analyzing the first sample image to identify fifth connected pixels thereof that are associated with object pixels.

14. The method of claim 13, further including determining the fifth connected pixels occupy an area less than a predetermined amount and not associating any connected pixels of the first object plane that correspond to the fifth connected pixels with an object identifier.

15. The method of claim 13, wherein the identifier comprises a first identifier, further including determining that the fifth connected pixels occupy an area greater than a predetermined amount and separating the fifth connected pixels into sixth and seventh connected pixels, associating eighth connected pixels of the first object map plane with a second identifier and ninth connected pixels of the first object map plane with a third identifier, wherein the second and third identifiers are associated with second and third objects, respectively.

16. The method of claim 10, wherein the steps of analyzing the first sample image and analyzing the second sample image are undertaken in parallel on a plurality of processors.

17. The method of claim 16, wherein the step of analyzing the first sample image includes analyzing a first portion of the first sample image and a second portion of the first sample image in parallel.

18. The method of claim 10, wherein the first sample image is acquired using a first imaging condition, and the step of analyzing the first sample image includes receiving a third sample image using a second imaging condition, and analyzing the first and third sample images.

19. The method of claim 10, further including receiving a specification of an image processing operation and, in response, undertaking the steps of analyzing the first sample image, analyzing the second sample image, associating the third connected pixels, and associating the fourth connected pixels.

\* \* \* \* \*